(12) United States Patent
Sugimoto et al.

(10) Patent No.: US 6,254,082 B1
(45) Date of Patent: *Jul. 3, 2001

(54) ROTARY VALVE

(75) Inventors: Ikuo Sugimoto; Kazuhiko Kato; Satoshi Shibata, all of Ibaragi (JP)

(73) Assignee: Komori Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,024

(22) Filed: Jun. 24, 1998

(30) Foreign Application Priority Data

Jun. 26, 1997 (JP) .................................... 9-170542
Feb. 9, 1998 (JP) .................................... 10-027142

(51) Int. Cl.$^7$ ..................................... F16K 11/00
(52) U.S. Cl. .............. 271/108; 137/624.13; 137/625.23; 137/625.24
(58) Field of Search ................. 137/624.13, 625.23, 137/625.24; 271/108

(56) References Cited

U.S. PATENT DOCUMENTS

| Re. 31,529 | * | 3/1984 | Lowe | .................. | 137/884 |
|---|---|---|---|---|---|
| 1,207,769 | * | 12/1916 | Kenney | .................. | 137/625.43 X |
| 1,677,499 | * | 7/1928 | Smith | .................. | 137/625.23 |
| 3,069,025 | | 12/1962 | Winkler et al. | . | |
| 3,884,460 | * | 5/1975 | Jiruse | .................. | 271/108 X |
| 4,320,893 | * | 3/1982 | Blumle | .................. | 271/108 X |

FOREIGN PATENT DOCUMENTS

| 199488 | 11/1938 | (DE) . |
|---|---|---|
| 1786165 | 1/1972 | (DE) . |
| 4215226 | 11/1993 | (DE) . |
| 4315549 | 11/1994 | (DE) . |
| 195 15 301 A1 | 4/1995 | (DE) . |
| 5-16304 | 3/1993 | (JP) . |

* cited by examiner

Primary Examiner—Gerald A. Michalsky
(74) Attorney, Agent, or Firm—Blakey Sokoloff Taylor & Zafman

(57) ABSTRACT

A rotary valve is interposed between an intake pump and an exhaust pump for supplying an air, and at least one suction head or one nozzle that performs a predetermined operation upon reception of the air supplied from the intake and exhaust pumps, to supply/stop supplying the air. This rotary valve includes a valve body, a main body, a notch, and a hollow portion. The valve body is rotatably driven in a cylinder. The main body rotatably supports the valve body. The notch is formed in a circumferential surface of the valve body and is connected to the intake pump. The hollow portion is formed in the valve body in an axial direction and is connected to the exhaust pump.

18 Claims, 8 Drawing Sheets

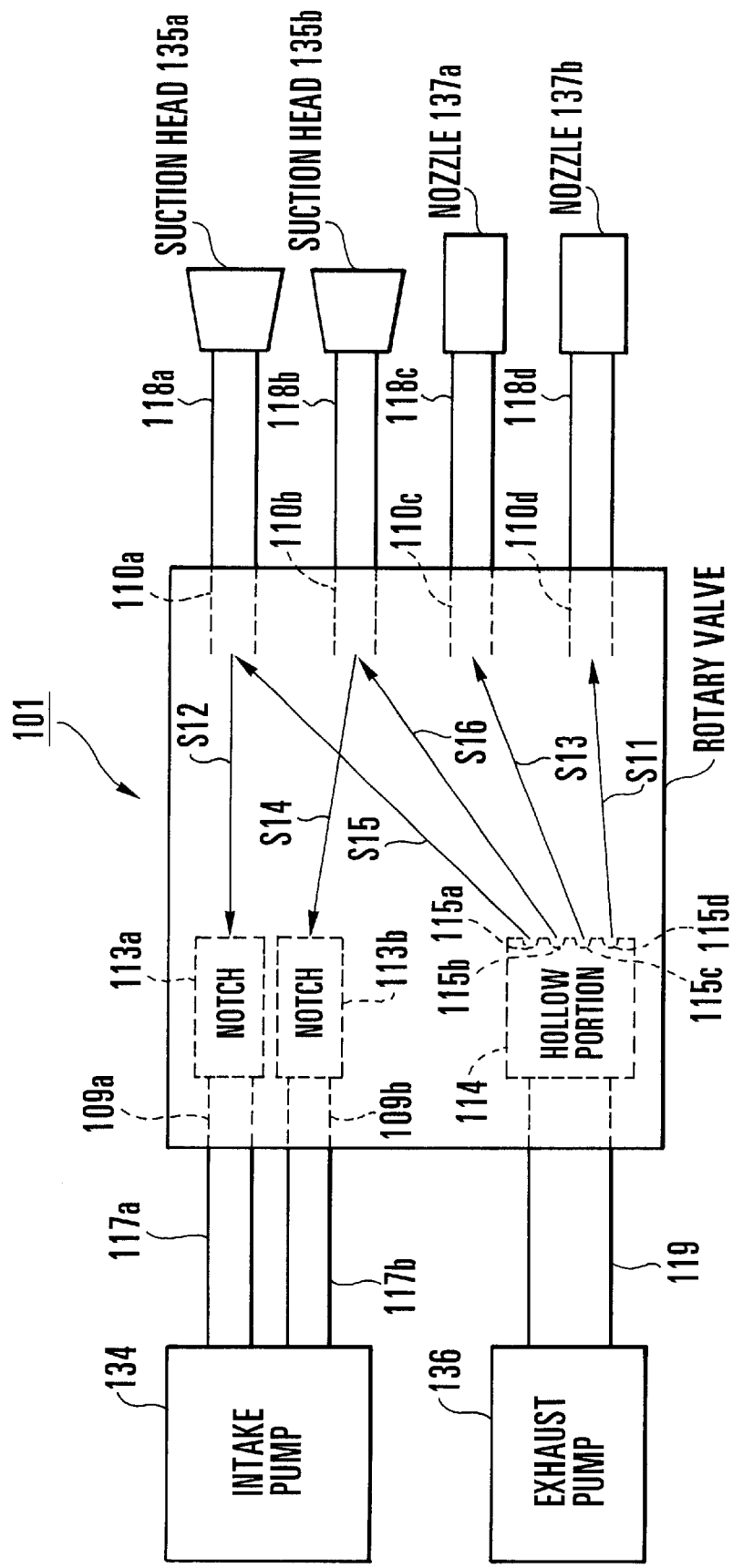
F I G. 3

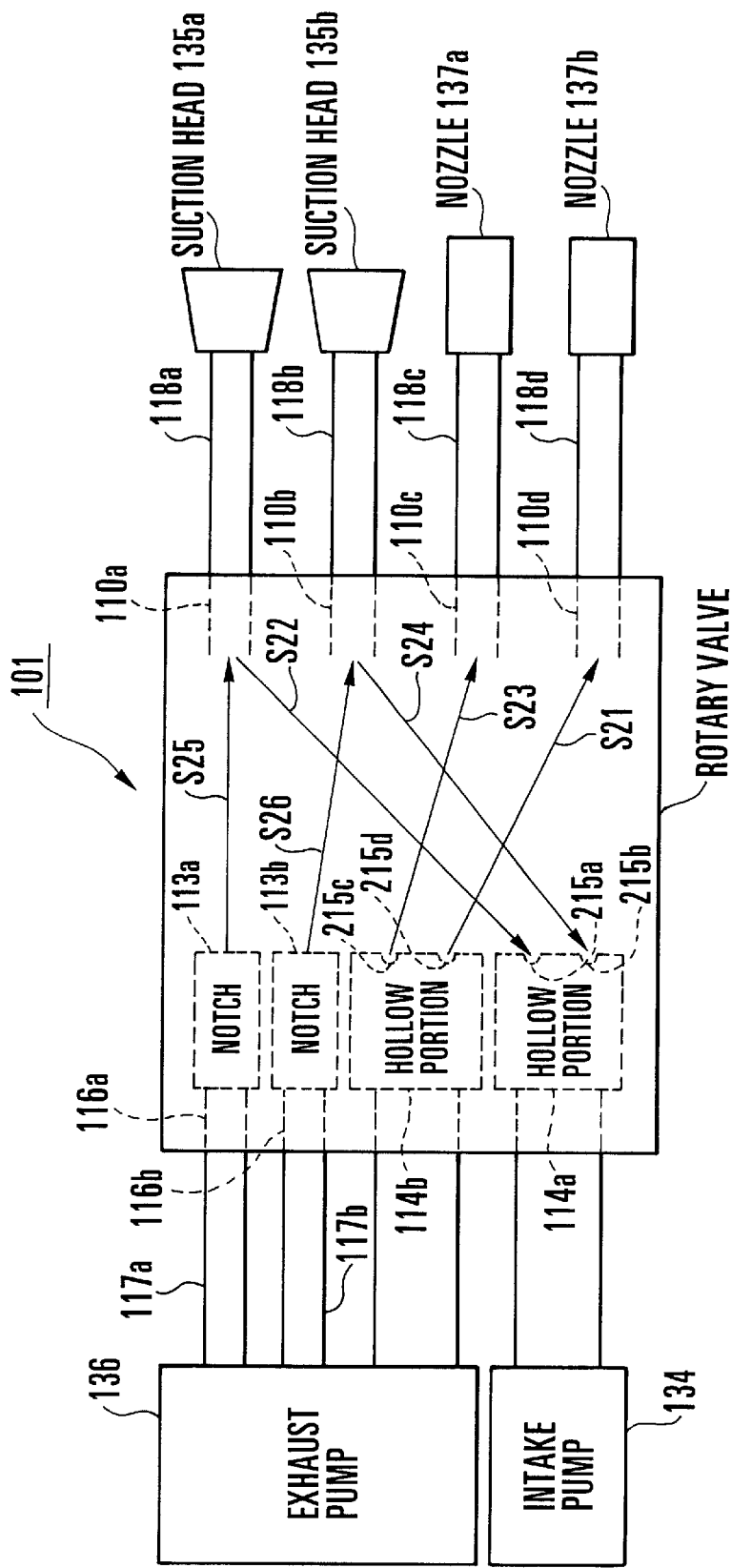
F I G. 6

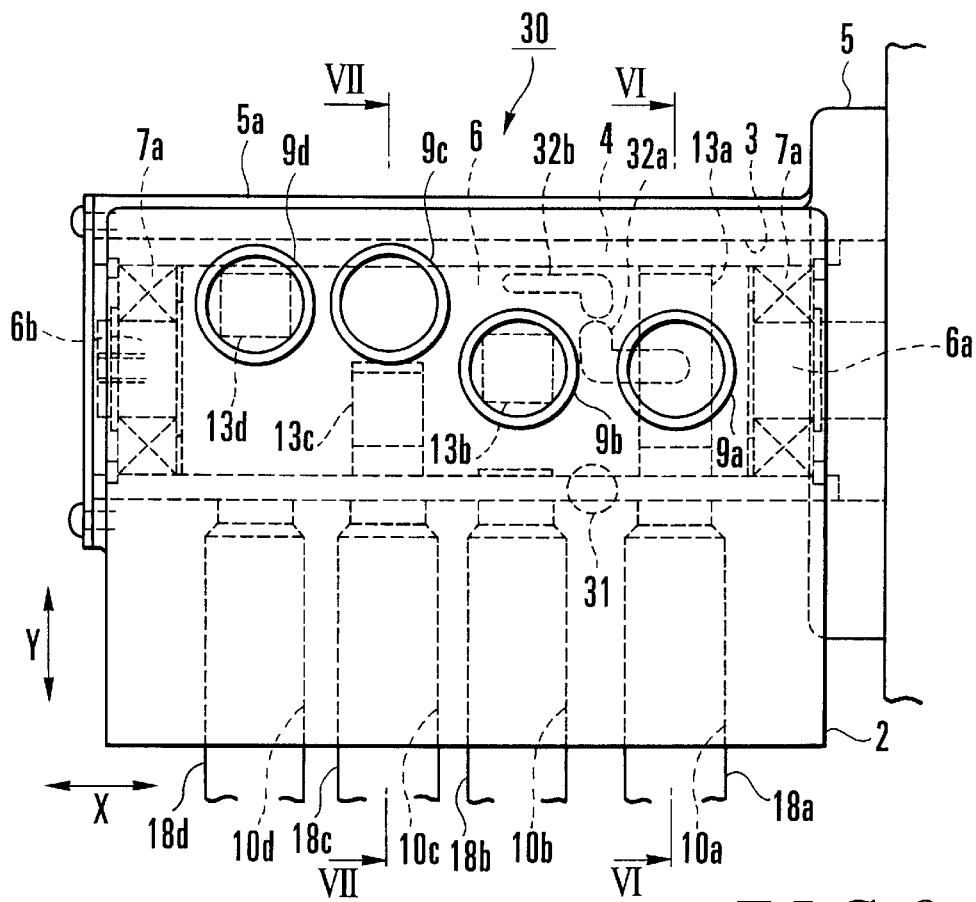
FIG. 9
PRIOR ART
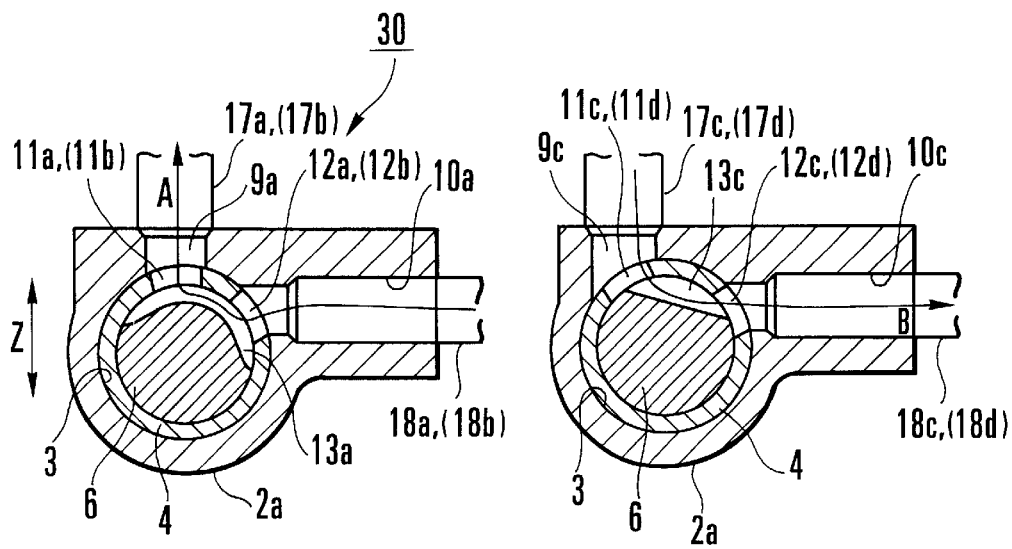
FIG. 10A
PRIOR ART
FIG. 10B
PRIOR ART

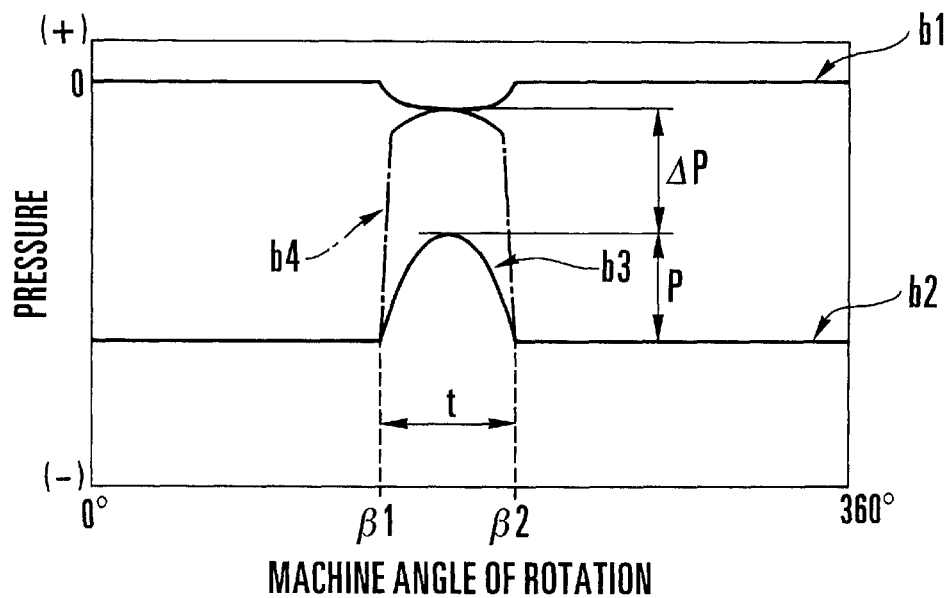
FIG. 11
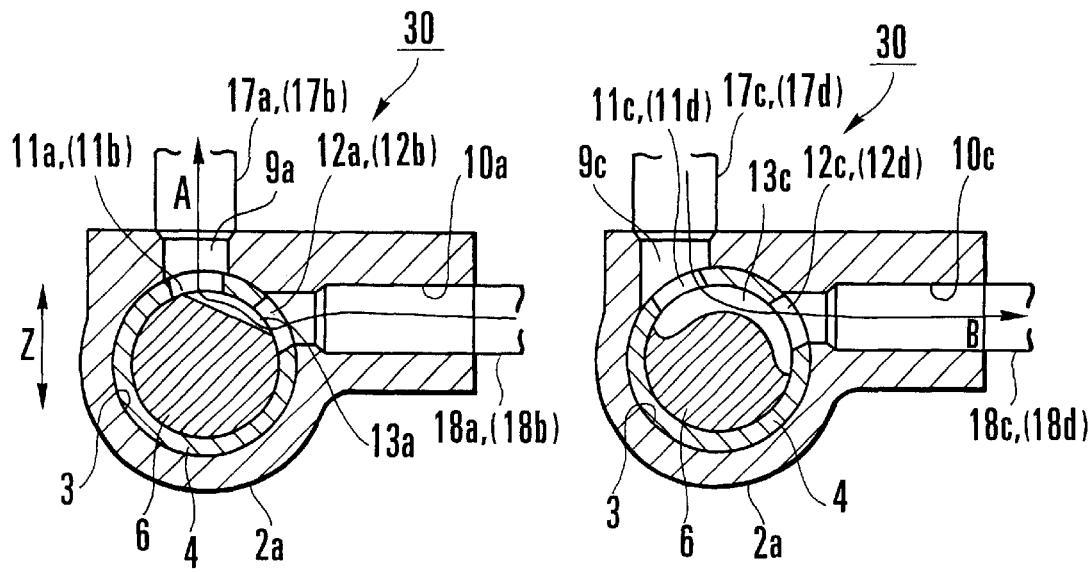
FIG. 12A
PRIOR ART
FIG. 12B
PRIOR ART

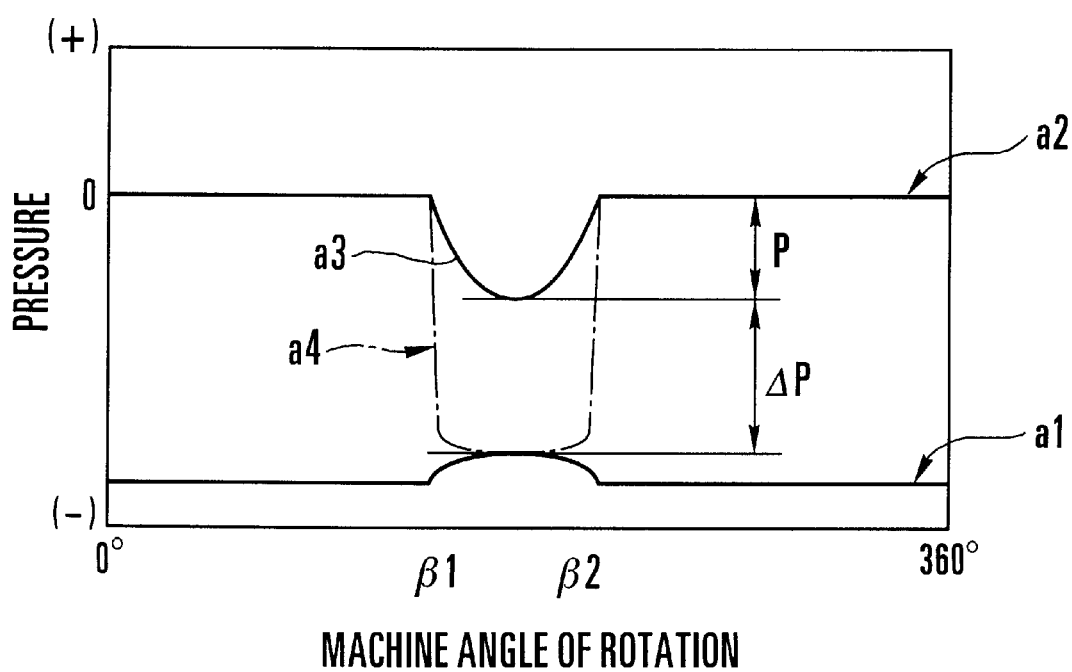
F I G. 13

US 6,254,082 B1

ROTARY VALVE

BACKGROUND OF THE INVENTION

The present invention relates to a rotary valve disposed between intake and exhaust air sources and suction and discharge units, to supply or stop supplying air.

In the sheet feeding unit of a sheet-fed offset printing press, a suction unit connected to an intake air source and a discharge unit connected to an exhaust air source are used to feed stacked sheets to the feeder board one by one. More specifically, in order to draw the highest sheet by suction with the suction unit, the air of the suction unit is taken by an intake pump serving as the intake air source. In order to blow air to the stacked sheets or to separate the top sheet drawing by the suction unit from the second top sheet underneath, or in order to discharge reverse air that facilitates separation of the sheet conveyed from the suction unit to the feeder board, exhaust air is supplied by an exhaust pump serving as the exhaust air source.

The ON/OFF timings of each of the intake air and exhaust air correspond to the rotation angle of the printing press main body. This series of timings are controlled by a rotary valve.

FIG. 9 shows a conventional rotary valve.

Referring to FIG. 9, in a rotary valve indicated by reference numeral 30, a main body 2 formed into a substantially rectangular parallelepiped shape is fixed to a frame 5 of a sheet feeding unit through a bracket 5a. The first and second suckers, a leveling foot, and an air blower (not shown) are provided to the sheet feeding unit. As shown in FIGS. 10A and 10B, the lower portion of the main body 2 in one end side in the direction of an arrow Z swells in an arcuated manner to constitute a swelling portion 2a.

A through hole 3 extending in the direction of an arrow X is formed in the swelling portion 2a, and a cylindrical sleeve 4 is fixed to the inner circumferential surface of the through hole 3. A valve body 6 is engaged in the sleeve 4. End shafts 6a and 6b on the two ends of the valve body 6 are rotatably supported by the sleeve 4 through bearings 7a and 7b. The valve body 6 rotates in an interlocked manner with rotation of the printing press through one end shaft 6a.

Four air passages 9a, 9b, 9c, and 9d, each having an open upper end and a lower end communicating with the through hole 3, are formed in the upper portion side of the main body 2 corresponding to the swelling portion 2a, to extend in the vertical direction (the direction of an arrow Z). Of the air passages 9a to 9d, the air passages 9a and 9b, on their upper end side, are connected to an intake pump (to be described later) through hoses 17a and 17b. The air passages 9a and 9b constitute an intake air passage. The air passages 9c and 9d, on their upper end side, are connected to an exhaust pump (to be described later) through hoses 17c and 17d. The air passages 9c and 9d constitute an exhaust air passage.

Air passages 10a, 10b, 10c, and 10d are formed in the main body 2 to extend in the direction of the arrow Y perpendicularly to the intake air passages 9a and 9b and the exhaust air passages 9c and 9d, respectively. One end of each of the air passages 10a to 10d opens to the outside of the main body 2 while the other end thereof communicates with the through hole 3.

Of the air passages 10a to 10d, the air passages 10a and 10b are connected to suction heads (to be described later), serving as the first and second suckers, through hoses 18a and 18b. The air passages 10a and 10b constitute a suction air passage. The air passages 10c and 10d are connected to nozzles (to be described later), respectively serving as a leveling foot and an air blower, through hoses 18c and 18d. The air passages 10c and 10d constitute a discharge air passage.

Reference numeral 31 denotes a reverse air passage for the suction heads. The reverse air passage 31 is formed between the suction air passages 10a and 10b to extend from the upper end of the main body 2 to the circumferential surface of the valve body 6 through the sleeve 4. The exhaust pump (described above) is connected to the upper opening end side of the reverse air passage 31 through a hose (not shown). At a certain machine angle of rotation of the valve body 6, the lower end of the reverse air passage 31 communicates with the suction air passages 10a and 10b through a notch (to be described later) formed in the valve body 6.

Vent holes 11a, 11b, 11c, and 11d are formed in the sleeve 4 to respectively correspond to the intake air passages 9a and 9b and the exhaust air passages 9c and 9d. Vent holes 12a, 12b, 12c, and 12d are also formed in the sleeve 4 to respectively correspond to the suction air passages 10a and 10b and the discharge air passages 10c and 10d.

As shown in FIG. 10A, a notch 13a through which the vent holes 11a and 12a communicate with each other is formed in the circumferential surface of the valve body 6 corresponding to the intake air passage 9a and the suction air passage 10a. Similarly, a notch 13b through which the vent holes 11b and 12b communicate with each other is formed in the circumferential surface of the valve body 6 corresponding to the intake air passage 9b and the suction air passage 10b, at a position displaced from the notch 13a in the axial direction and to be phase-shifted from the notch 13a in the rotating direction of the valve body 6.

As shown in FIG. 10B, a notch 13c through which the vent holes 11c and 12c communicate with each other is formed in the circumferential surface of the valve body 6 corresponding to the intake air passage 9c and the suction air passage 10c. Similarly, a notch 13d through which the vent holes 11d and 12d communicate with each other is formed in the circumferential surface of the valve body 6 corresponding to the intake air passage 9d and the suction air passage 10d, at a position displaced from the notch 13c in the axial direction and to be phase-shifted from the notch 13c in the rotating direction of the valve body 6.

In this arrangement, when the valve body 6 is rotated in an interlocked manner with rotation of the printing press main body, the notch 13d of the valve body 6 is in communication with the vent holes 11d and 12d of the sleeve 4, and the exhaust air passage 9d and the discharge air passage 10d communicate with each other through the notch 13d. Thus, air exhausted from the exhaust pump flows through the air passages 9d and 10d that communicate with each other through the notch 13d, and is discharged from the nozzles to blow air to the sheets.

When the valve body 6 is continuously rotated, the notch 13a is in communication with the vent holes 11a and 12a, and the intake air passage 9a and the suction air passage 10a communicate with each other through the notch 13a. Thus, as shown in FIG. 10A, intake air A taken by the intake pump flows through the air passages 9a and 10a that communicate with each other through the notch 13a, to draw the top sheet by suction with the first sucker.

When the valve body 6 is continuously rotated, the notch 13c is in communication with the vent holes 11c and 12c of the sleeve 4, and the exhaust air passage 9c and the discharge air passage 10c communicate with each other through the notch 13c. Thus, as shown in FIG. 10B, exhaust air B exhausted from the exhaust pump flows through the air passages 9c and 10c that communicate with each other through the notch 13c, and is discharged from the nozzle serving as the leveling foot. At this time, the discharged air is blown to a portion between the top sheet drawn by the suction heads and the second top sheet underneath, to separate them from each other.

When the valve body 6 is further rotated, the notch 13b opposes the vent holes 11b and 12b, and the intake air passage 9b and the suction air passage 10b communicate with each other through the notch 13b. Thus, the intake air taken by the intake pump flows through the air passages 9b and 10b that communicate with each other through the notch 13b, to draw a sheet by suction with the second sucker.

Simultaneously, the notch 13a is displaced from the vent hole 12a, and the intake air passage 9a and the suction air passage 10a are disconnected from each other. Thus, suction air supply is stopped, and the sheet suction operation with the first sucker is stopped.

Since a notch 32a of the valve body 6 is in communication with the reverse air passage 31, the reverse air passage 31 and the suction air passage 10a communicate with each other through the notch 32a. The exhaust air exhausted from the exhaust pump flows through the air passages 31 and 10a and is blown out of the first sucker, and the sheet is quickly released from the first sucker that has ended the suction operation. As a result, a sheet which is conveyed over the feeder board while being drawn by the second sucker will not be cut or bent.

When the second sucker during sheet conveyance is located above the feeder board, the notch 13b is displaced from the vent hole 12b in accordance with rotation of the valve body 6, and the intake air passage 9b and the suction air passage 10b are disconnected from each other. Thus, intake air supply is stopped, and the sheet suction operation with the second sucker is stopped. At this time, a notch 32b is in communication with the reverse air passage 31, and the reverse air passage 31 and the suction air passage 10b communicate with each other through the notch 32b. The exhaust air exhausted from the exhaust pump flows through the air passages 31 and 10b and is blown out of the second sucker. The sheet is quickly released from the second sucker that has ended the suction operation, and is supplied onto the feeder board.

In the discharge operation of the nozzles, if the air discharge time of the nozzles is shorter than the suction time of the suction heads, the notch 13c constituting the air passage from the exhaust pump is formed smaller along with the rotation of the valve body 6 than the notch 13a constituting the air passage from the intake pump, as shown in FIGS. 10A and 10B. Inversely, in the suction operation of the suction heads, if the suction time of the suction heads is shorter than the air discharge time of the nozzles, the notch 13a is formed smaller than the notch 13c, as shown in FIGS. 12A and 12B.

As shown in FIG. 10B, if the notch 13c is made small to shorten the air discharge time from the nozzles, along with rotation of the valve body 6, as the opening of the vent hole 11c is enlarged, the opening of the vent hole 12c is narrowed. For this reason, a predetermined air pressure cannot be obtained on the nozzle side.

Accordingly, the amount of air from the nozzles becomes short and air blowing to the stacked sheets is not performed sufficiently, and two or more sheets are undesirably drawn by the suction heads. In this case, operation of the printing press must be stopped, or the printing press may cause a trouble to decrease the productivity. Since the supply amount of reverse air from the suction heads becomes short to delay sheet release from the suction heads, the sheet may be cut or bent to degrade the printing quality.

When the operation speed of the printing press increases, the time of forming the air passage in the rotary valve is shortened. Then, a predetermined discharge air pressure from the nozzles cannot be obtained, in the same manner as described above.

Meanwhile, as shown in FIG. 12A, if the notch 13a is made small to shorten the suction time of the suction heads, along with rotation of the valve body 6, as the opening of the vent hole 11a is enlarged, the opening of the vent hole 12a is narrowed. As a result, a predetermined air pressure cannot be obtained with the suction heads, and defective sheet supply may occur.

FIG. 11 shows the relationship in pressure of the input/output air of the rotary valve of FIG. 10B during the discharge operation. Referring to FIG. 11, reference numeral b1 denotes the pressure of the exhaust air input to the rotary valve 30. The pressure b1 is the pressure of the exhaust air from the exhaust pump. Reference numeral b2 denotes the pressure of the discharge air output from the rotary valve. The pressure b2 is the pressure of the discharge air from the nozzles.

When the machine angle of rotation of the printing press becomes β1, the notch 13c of the valve body 6 is in communication with the vent holes 11c and 12c of the sleeve 4, and discharge air is supplied from an exhaust pump 36 to the nozzles through the exhaust air passage 9c, the notch 13c, and the discharge air passage 10c. The pressure of air supplied to the nozzles at this time is expressed as a pressure P. Subsequently, when the machine angle of rotation becomes β2, the notch 13c is displaced from the vent hole 12c, the vent hole 12c is closed with the circumferential surface of the valve body 6, and supply of the discharge air to the discharge air passage 10c is stopped.

At this time, in the conventional rotary valve 30, a pressure b3 of the discharge air between the machine angles β1 and β2 of rotation becomes lower than a necessary pressure b4 by a pressure difference ΔP. This is due to the following reason. Since the notch 13c is small, along with rotation of the valve body 6, as the opening of the vent hole 11c is enlarged, the opening of the vent hole 12c is narrowed, so the air exhausted from the exhaust pump 36 is not sufficiently supplied to the nozzles.

FIG. 13 shows the relationship of the input/output air of the rotary valve shown in FIG. 12A during the suction operation. As shown in FIG. 13, even during the suction operation, a pressure loss in air of the rotary valve occurs. Reference numeral a1 denotes the pressure of the intake air input to the rotary valve 30. The pressure a1 is the pressure of intake air from the intake pump. Reference numeral a2 denotes the pressure of the suction air output from the rotary valve 30. The pressure a2 is the pressure of the suction air of the suction heads. As shown in FIG. 13, a pressure a3 of the suction air between the machine angles β1 and β2 of rotation becomes higher than a necessary pressure a4 by a pressure difference ΔP.

SUMMARY OF THE INVENTION

It is an object of the present invention to provide a rotary valve which can obtain a predetermined air pressure even when the actuation time by the air is short.

It is another object of the present invention to provide a rotary valve in which a pressure loss in air in its interior is decreased.

In order to achieve the above objects, according to the present invention, there is provided a rotary valve, which is interposed between first and second air sources for supplying an air, and at least one air unit that performs a predetermined operation upon reception of the air supplied from the first and second air sources, to supply/stop supplying the air, the rotary valve comprising a valve body rotatably driven in a cylinder, a main body for rotatably supporting the valve body, a notch formed in a circumferential surface of the valve body, to be connected to the first air source, and a first hollow portion formed in the valve body in an axial direction to be connected to the second air source.

BRIEF DESCRIPTION OF THE DRAWINGS

FIG. 3 is a diagram showing the schematic arrangement of the sheet feeding unit of a printing press to which the first embodiment is applied;

FIG. 6 is a diagram showing the schematic arrangement of a sheet feeding unit to which the second embodiment is applied;

FIG. 9 is a plan view of a conventional rotary valve;

FIG. 10A is a sectional view taken along the line VI—VI of FIG. 9, and FIG. 10B is a sectional view taken along the line VII—VII of FIG. 9;

FIG. 11 is a graph showing the relationship in pressure of the input/output air of the rotary valve of FIG. 10B during discharge operation;

FIG. 12A is a sectional view showing the main part of another example of the rotary valve that corresponds to FIG. 10A, and FIG. 12B is a sectional view showing the main part of still another example of the rotary valve that corresponds to FIG. 10B; and FIG. 13 is a graph showing the relationship in pressure of the input/output air of the rotary valve of FIG. 12A during suction operation.

DESCRIPTION OF THE PREFERRED EMBODIMENTS

Figure 1:
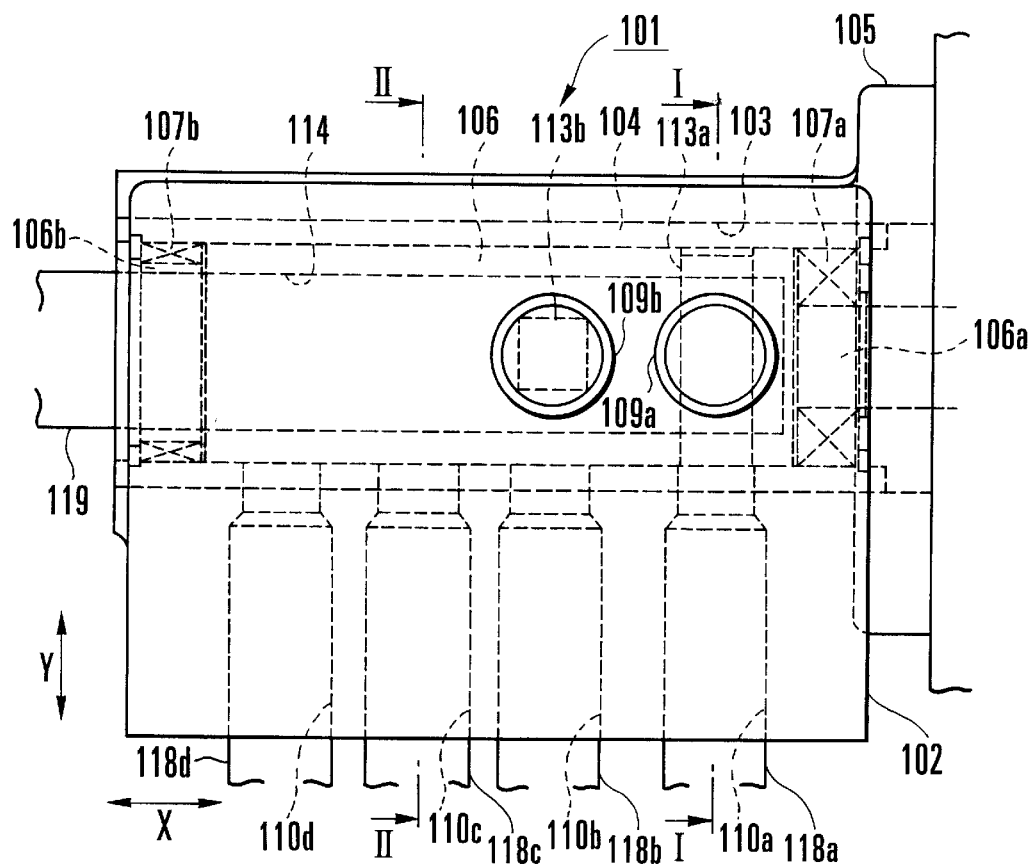
FIG. 1 is a plan view of a rotary valve according to the first embodiment of the present invention.

The present invention will be described in detail with reference to the accompanying drawings.

FIG. 3 shows the schematic arrangement of a sheet feeding unit for a printing press to which the present invention is applied. Referring to FIG. 3, the air source side of a rotary valve 101 is connected to an intake pump 134 serving as an intake air source, and an exhaust pump 136 serving as an exhaust air source, through hoses 117a and 117b, and a hose 119, respectively. The suction/discharging side of the rotary valve 101 is connected to suction heads 135a and 135b serving as the suction units, and nozzles 137a and 137b serving as the discharge unit, through hoses 118a and 118b, and hoses 118c and 118d, respectively. The suction heads 135a and 135b serve as the first and second suckers of the sheet feeding unit, and the nozzles 137a and 137b serve as a leveling foot and an air blower.

Figures 2A, 2B:
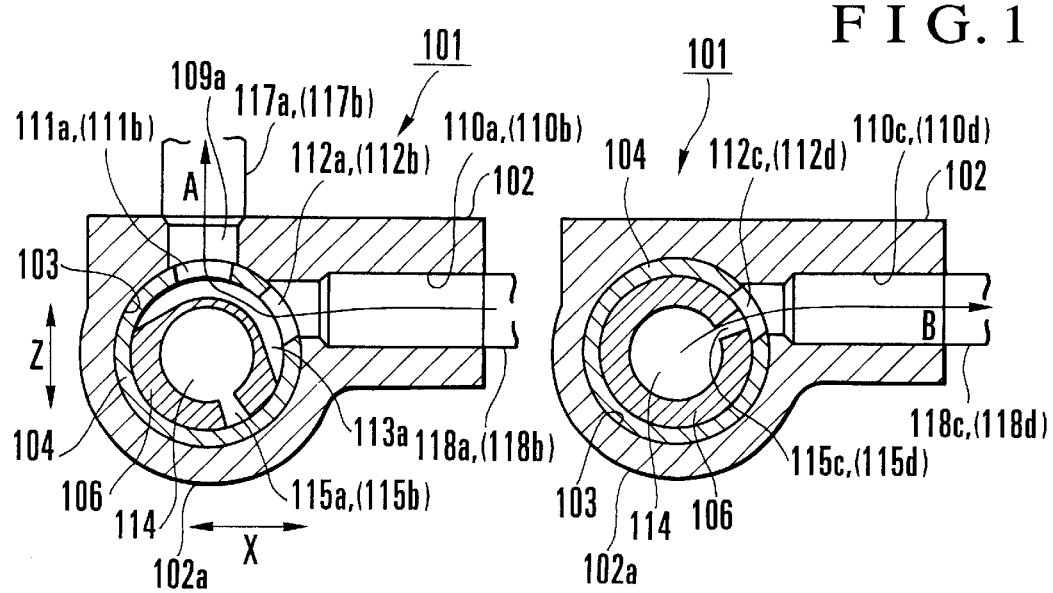
FIG. 2A is a sectional view taken along the line I—I of FIG. 1.
FIG. 2B is a sectional view taken along the line II—II of FIG. 1.

FIG. 1 shows the rotary valve shown in FIG. 3, which is the first embodiment of the present invention. Referring to FIG. 1, a main body 102 formed into a substantially rectangular parallelepiped shape is fixed to a frame 105 of the sheet feeding unit through a bracket 105a. As shown in FIGS. 2A and 2B, the lower portion of the main body 102 in one end side in the direction of an arrow Z swells in an arcuated manner to constitute a swelling portion 102a.

A through hole 103 extending in the direction of an arrow X is formed in the swelling portion 102a, and a cylindrical sleeve 104 is fixed to the inner surface of the through hole 103. A valve body 106 is engaged in the sleeve 104. End shafts 106a and 106b on the two ends of the valve body 106 are rotatably supported by the sleeve 104 through bearings 107a and 107b. The valve body 106 rotates in an interlocked manner with rotation of the printing press through one end shaft 106a.

Two air passages 109a and 109b, each having an open upper end and a lower end communicating with the through hole 103, are formed in the upper portion side of the main body 102 corresponding to the swelling portion 102a, to extend in the vertical direction (the direction of an arrow Z). As described above, the air passages 109a and 109b, on their upper end side, are connected to the intake pump 134 through the hoses 117a and 117b, and the air passages 109a and 109b constitute an intake air passage (air passage for the intake air source).

Air passages 110a and 110b are formed in the main body 102 to extend in the direction of the arrow Y perpendicularly to the intake air passages 109a and 109b. Also, air passages 110c and 110c are formed in parallel to the air passages 110a and 110b. One end of each of the air passages 110a to 110d opens to the outside of the main body 102 while the other end thereof is connected to the through hole 103.

Of the air passages 110a to 110d, the air passages 110a and 110b are connected to the suction heads 135a and 135b through the hoses 118a and 118b, as described above. The air passages 110a and 110b constitute a suction air passage (air passage for the suction unit). As described above, the air passages 110c and 110d are connected to the nozzles 137a and 137b through the hoses 118c and 118d, and the air passages 110c and 110d constitute a discharge air passage (air passage for the discharge unit).

Vent holes 111a and 111b are formed in the sleeve 104 to respectively correspond to the intake air passages 109a and 109b. Vent holes 112a, 112b, 112c, and 112d are also formed in the sleeve 104 to respectively correspond to the suction air passages 110a and 110b and the discharge air passages 110c and 10d.

As shown in FIGS. 2A and 2B, a blind hole-like hollow portion 114 is formed in the valve body 106 to have an opening in the end face of the valve body 106 on one end shaft 106b side and to extend in the direction of an arrow X to a position corresponding to the intake air passage 109a. As described above, the exhaust pump 136 is connected to the opening side of the hollow portion 114 through the hose 119. Accordingly, the hollow portion 114 constitutes an exhaust air passage (air passage for the exhaust air source).

A communication hole 115a (FIG. 2A) is formed in the valve body 106. The communication hole 115a allows the hollow portion 114 to communicate with the suction air passage 110a through the vent hole 112a. Similarly, a communication hole 115b is formed in the valve body 106 at a position displaced from the communication hole 115a in the axial direction and to be phase-shifted from the communication hole 115a in the rotating direction. The communication hole 115b allows the hollow portion 114 to communicate with the suction air passage 110b through the vent hole 112b.

A communication hole 115c (FIG. 2B) is formed in the valve body 106. The communication hole 115c allows the hollow portion 114 to communicate with the discharge air passage 110c through the vent hole 112c. Similarly, a communication hole 115d is formed in the valve body 106 at a position displaced from the communication hole 115c in the axial direction and to be phase-shifted from the communication hole 115c in the rotating direction. The communication hole 115d allows the hollow portion 114 to communicate with the discharge air passage 110d through the vent hole 112d.

As shown in FIG. 2A, a notch 113a through which the vent holes 111a and 112a communicate with each other is formed in the circumferential surface of the valve body 106 corresponding to the intake air passage 109a and the suction air passage 110a. Similarly, a notch 113b through which the vent holes 111b and 112b communicate with each other is formed in the circumferential surface of the valve body 106 corresponding to the intake air passage 109b and the suction air passage 110b, at a position displaced from the notch 113a in the axial direction and to be phase-shifted from the notch 113a in the rotating direction of the valve body 106.

Therefore, the characteristic feature of this embodiment resides in that the blind hole-like hollow portion 114 having a circular section is formed in the valve body 106 to extend in the axial direction and that this hollow portion 114 serves as the exhaust air passage. The conventional exhaust air passages 9c and 9d and reverse air passage 31 shown in FIG. 9 and FIGS. 10A and 10B are replaced with the hollow portion 114, so that the reverse air passage 31 and the notches 32a and 32b formed in the valve body 6 become unnecessary.

The switching operation between intake and exhaustion done by the rotary valve having this arrangement will be described with reference to FIG. 3.

When the valve body 106 is rotated in an interlocked manner with rotation of the printing press, the communication hole 115d of the valve body 106 is in communication with the vent hole 112d of the sleeve 104, and the hollow portion 114 serving as the exhaust air passage and the discharge air passage 110d communicate with each other through the communication hole 115d and the vent hole 112d. Therefore, exhaust air from the exhaust pump 136 flows through the hollow portion 114 and the air passage 110d, and is discharged from the nozzle 137b to blow the air to stacked sheets (step S11).

When the valve body 106 is continuously rotated, the notch 113a is in communication with the vent holes 112a and 111a, and the intake air passage 109a and the suction air passage 110a communicate with each other through the notch 113a. Thus, as shown in FIG. 2A, intake air A from the intake pump 134 flows through the air passages 109a and 110a that communicate with each other, and is supplied to the suction head 135a serving as the first sucker, to draw the top sheet by suction (step S12).

When the valve body 106 is continuously rotated, the communication hole 115c is in communication with the vent hole 112c of the sleeve 104, and the hollow portion 114 serving as the exhaust air passage and the discharge air passage 110c communicate with each other through the communication hole 115c and a vent hole 111c, as shown in FIG. 2B. Exhaust air B from the exhaust pump 134 is supplied to the nozzle 137a, serving as the leveling foot, through the hollow portion 114 and the air passage 110c. The air is blown to a portion between the top sheet and the second sheet underneath, to separate them from each other (step S13).

When the valve body 106 is continuously rotated, the notch 113b is in communication with the vent holes 112b and 111b, and the intake air passage 109b and the suction air passage 110b communicate with each other through the notch 113b. Therefore, intake air from the intake pump 134 is supplied to the suction head 135b, serving as the second sucker, through the air passages 109b and 110b, to draw a sheet by suction (step S14).

Simultaneously, the communication hole 115a of the valve body 106 is in communication with the vent hole 112a, and the hollow portion 114 and the suction air passage 110a communicate with each other through the communication hole 115a and the vent hole 112a. The exhaust air from the exhaust pump 136 is supplied to the suction head 135a, serving as the first sucker, through the hollow portion 114 and the air passage 110a. The sheet is quickly released from the suction head 135a that has ended the suction operation (step S15). As a result, a sheet which is conveyed over the feeder board while being drawn by the suction head 135b, serving as the second sucker will not be torn or bent.

When the suction head 135b during sheet conveyance has been located above the feeder board, as the valve body 106 is rotated, the communication hole 115b is in communication with the vent hole 112b, and the hollow portion 114 and the suction air passage 110b communicate with each other through the communication hole 115b and vent hole 112b. The exhaust air from the exhaust pump 136 is supplied to the suction head 135b through the hollow portion 114 and the air passage 110b. The sheet is quickly released from the suction head 135b, and is supplied onto the feeder board (step S16).

According to this embodiment, during the air discharge operation, the air is supplied from the exhaust pump 136 to the nozzles 137a and 137b through the hollow portion 114 and the communication holes 115c and 115d. Therefore, the air blowing and leveling foot operation can be reliably performed within a short period of time with the sufficiency high-pressure air.

During the air discharge operation, the hollow portion 114, the communication holes 115c and 115d, the vent holes 111c and 111d, and the discharge air passages 110c and 110d are located on a substantially straight line, so that the air loss during the leveling foot operation and air blowing is decreased. Therefore, an exhaust pump having a comparatively small power can be used.

Since the exhaust air is supplied through the hollow portion 114 of the valve body 106 which has a large sectional area, the pressure loss of the air at the valve portion is decreased. Also, the exhaust air passages 9c and 9d conventionally formed in the main body 2 or the vent holes 11c and 11d conventionally formed in the sleeve 4 become unnecessary, and only the hollow portion 114 and the communication holes 115a to 115d need be formed in the valve body 106. Therefore, the structure is simplified and machining becomes easy.

Since the notches 32a and 32b of the valve body 6 and the reverse air passage 31, which are conventionally necessary, becomes unnecessary, the structure is simplified. Since the hollow portion 114, the communication holes 115a and 115b, the vent holes 111a and 111b, and the suction air passages 110a and 110b are located on a substantially straight line, the air pressure loss during reverse blowing is decreased.

Figure 4:
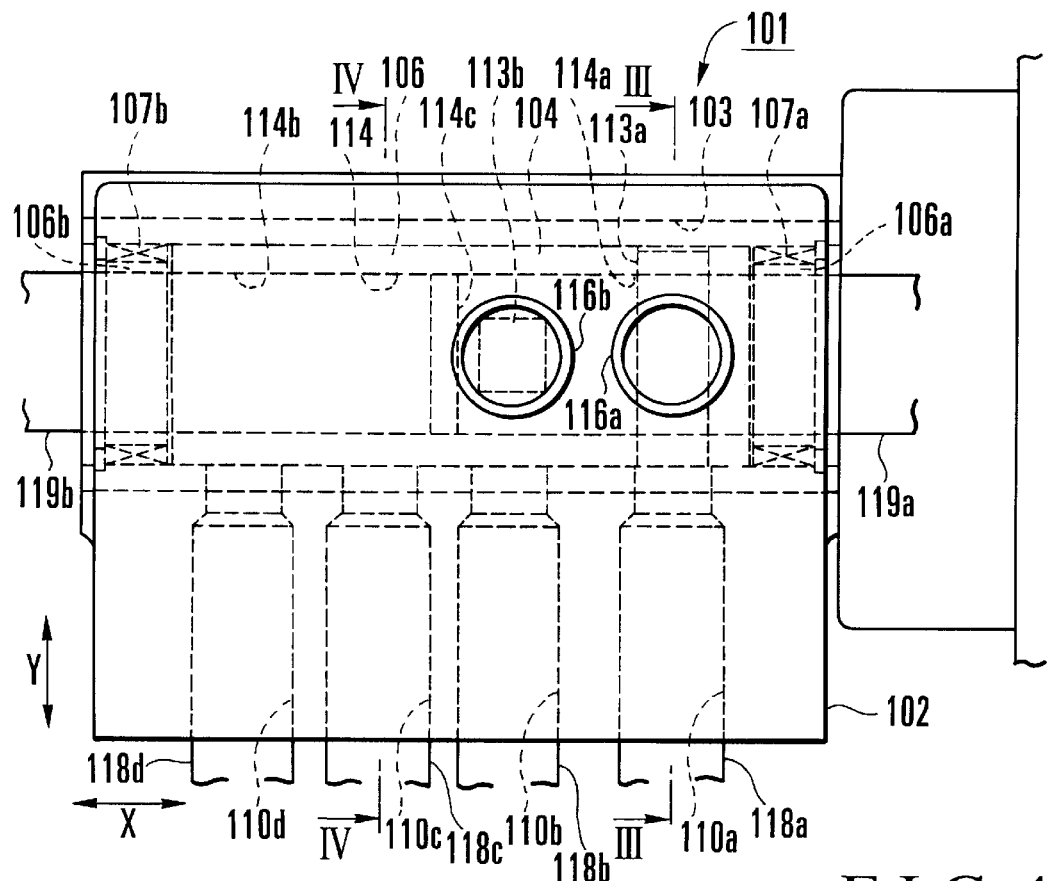
FIG. 4 is a plan view of a rotary valve according to the second embodiment of the present invention.
Figures 5A, 5B:
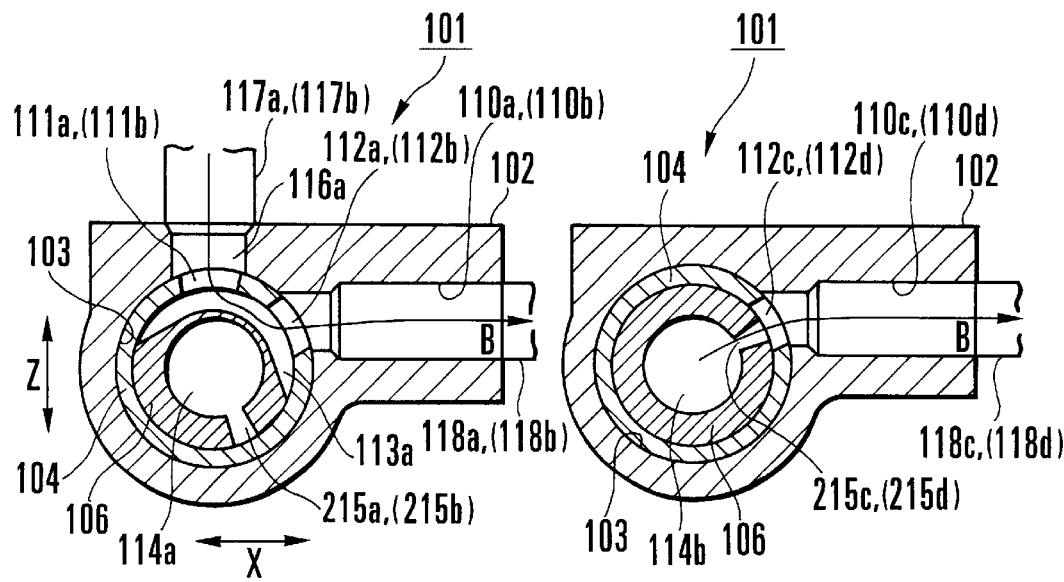
FIG. 5A is a sectional view taken along the line III—III of FIG. 4.
FIG. 5B is a sectional view taken along the line IV—IV of FIG. 4.

FIG. 4 shows a rotary valve according to the second embodiment of the present invention. FIG. 5A shows a section taken along the line III—III of FIG. 4, and FIG. 5B shows section taken along the line IV—IV of FIG. 4. In FIG. 4 and FIGS. 5A and 5B, portions that are identical to those of FIG. 1 and FIGS. 2A and 2B are denoted by the same reference numerals as in FIG. 1 and FIGS. 2A and 2B, and a detailed description thereof will be omitted.

The second embodiment is different from the first embodiment in that, as shown in FIG. 4, a partition wall 114c is formed at the center of a hollow portion 114 to divide the hollow portion 114 into a first hollow portion 114a and a second hollow portion 114b.

As shown in FIG. 6, the first hollow portion 114a is connected to an intake pump 134 through a hose 119a to constitute an intake air passage. The second hollow portion 114b is connected to an exhaust pump 136 through a hose 119b, in the same manner as in the first embodiment. Air passages 116a and 116b formed in the upper end side of a main body 102 are connected to the exhaust pump 136 through hoses 117a and 117b to constitute an exhaust air passage.

A communication hole 215a (FIG. 5A), where the hollow portion 114 extends to communicate with a suction air passage 110a through a vent hole 112a, is formed in the valve body 106. Similarly, a communication hole 215b, where the hollow portion 114 extends to communicate with the suction air passage 110b through a vent hole 112b, is formed in the valve body 106, at a position displaced from the communication hole 215a in the axial direction and to be phase-shifted from the communication hole 215a in the rotating direction. A communication hole 215c (FIG. 5B), where the hollow portion 114 extends to communicate with a discharge air passage 110c through a vent hole 112c, is also formed in the valve body 106. Similarly, a communication hole 215d, where the hollow portion 114 extends to communicate with a suction air passage 110d through a vent hole 112d, is formed in the valve body 106, at a position displaced from the communication hole 215c in the axial direction and to be phase-shifted from the communication hole 215c in the rotating direction.

The switching operation between intake and exhaustion done by the rotary valve having this arrangement will be described with reference to FIG. 6.

When the valve body 106 is rotated in an interlocked manner with rotation of the printing press, the communication hole 215d of the valve body 106 is in communication with the vent hole 112d of the sleeve 104, and the second hollow portion 114b serving as the exhaust air passage and the discharge air passage 110d communicate with each other through a communication hole 115d and the vent hole 112d. Exhaust air from the exhaust pump 136 is supplied to a nozzle 137b through the second hollow portion 114b and the air passage 110d, to blow air to stacked sheets (step S21).

When the valve body 106 is continuously rotated, its communication hole 215a is in communication with the vent hole 112a, and the first hollow portion 114a serving as the intake air passage and the suction air passage 110a communicate with each other through the communication hole 215a and the vent hole 112a. Intake air from the intake pump 134 is supplied to a suction head 135a, serving as the first sucker, through the suction air passage 110a and the first hollow portion 114a, to draw the top sheet by suction (step S22).

When the valve body 106 is continuously rotated, the communication hole 215c opposes the vent hole 112c of a sleeve 104, and the second hollow portion 114b serving as the exhaust air passage and the discharge air passage 110c communicate with each other through the communication hole 215c and the vent hole 112c, as shown in FIG. 5B. Exhaust air B from the exhaust pump 136 is supplied to a nozzle 137a, serving as the leveling foot, through the second hollow portion 114b and the suction air passage 110c. The air is blown to a portion between the top sheet and the second sheet underneath, to separate them from each other (step S23).

When the valve body 106 is continuously rotated, the communication hole 215b of the valve body 106 is in communication with the vent hole 112b, and the first hollow portion 114a and the suction air passage 110a communicate with each other through the communication hole 215b and the vent hole 112b. Intake air from the intake pump 134 is supplied to a suction head 135b, serving as the second sucker, through the first hollow portion 114a and the suction air passage 110a, to draw the top sheet by suction (step S24).

Simultaneously, a notch 113a is in communication with the vent hole 112a and a vent hole 111a, and an exhaust air passage 116a and the discharge air passage 111a communicate with each other through the notch 113a, as shown in FIG. 5A. Thus, the exhaust air B from the exhaust pump 136 is supplied to the suction head 135a, serving as the first sucker, through the air passages 116a and 110a. The sheet is quickly released from the suction head 135a that has ended the suction operation (step S25). As a result, a sheet which is conveyed over the feeder board while being drawn by the suction head 135b, serving as the second sucker, will not be torn or b ent.

When the second suction head 135b during sheet conveyance has been located above the feeder board, as the valve body 106 is rotated, a notch 113b is in communication with the vent hole 112b and a vent hole 111b, and an exhaust air passage 116b and the discharge air passage 110b communicate with each other through the notch 113b. The exhaust air from the exhaust pump 136 is supplied to the suction head 135b through the air passages 116b and 110b. The sheet is quickly released from the suction head 135b, and is supplied onto the feeder board (step S26).

According to this embodiment, during the suction operation, the air is supplied from the intake pump 134 to the suction heads 135a and 135b through the first hollow portion 114a and the communication holes 215a and 215b. Therefore, the suction operation can be reliably performed within a short period of time with the sufficiency high-pressure air.

During the suction operation, the first hollow portion 114a, the communication holes 215a and 215b, and the vent holes 112a and 112b are located on a substantially straight line, so that the pressure loss of the suction air is decreased. Since the first hollow portion 114a of the valve body 106, which has a large sectional area, serves as the intake air passage, the pressure loss of the air at the valve portion is small.

Figure 7:
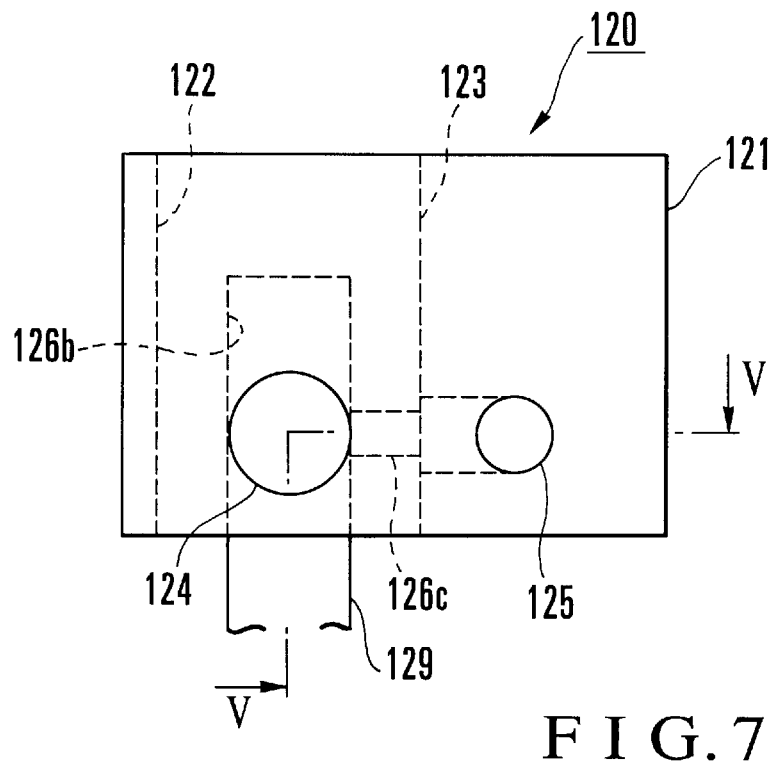
FIG. 7 is a plan view of a rotary valve according to the third embodiment of the present invention.
Figure 8:
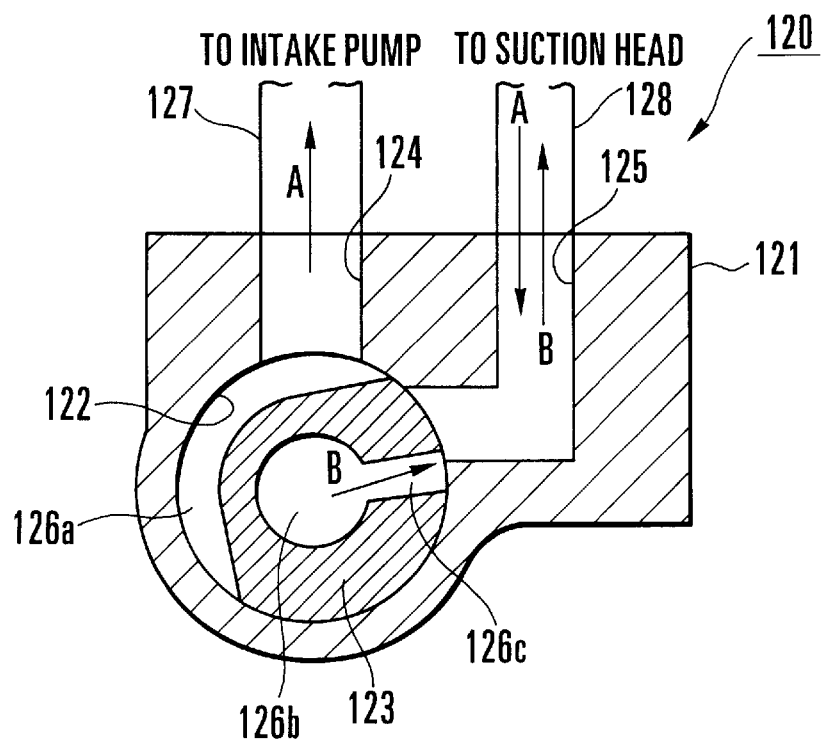
FIG. 8 is a sectional view taken along the line V—V of FIG. 7.

FIG. 7 shows a rotary valve according to the third embodiment of the present invention, and FIG. 8 shows a section taken along the line V—V of FIG. 7.

A rotary valve 120 of the third embodiment controls to supply/stop supplying of the air of the first sucker of the sheet feeding unit. More specifically, a through hole 122 is formed in a main body 121 of the rotary valve 120. A valve body 123 which rotates in an interlocked manner with the printing press is rotatably engaged with the inner surface of the through hole 122. An intake air passage 124 and a suction air passage 125 are formed in the upper portion of the main body 121. The air passage 124 has an open upper end and a lower end that communicates with the through hole 122. The suction air passage 125 has an L-shaped section.

The upper end open side of the intake air passage 124 is connected to an intake pump through a hose 127. The upper end open side of the suction air passage 125 is connected to a suction head, serving as the first sucker, through a hose 128. A notch 126a is formed in part of the circumferential surface of the valve body 123. A blind hole-like hollow portion 126b is formed in the valve body 123 to extend in the axial direction. A communication hole 126c, through which the hollow portion 126b and the suction air passage 125 communicate with each other, is also formed in the valve body 123. The open end side of the hollow portion 126b is connected to an exhaust pump through a hose 129. The hollow portion 126b constitutes an exhaust air passage.

In this arrangement, when the valve body 123 is rotated in an interlocked manner with the printing press, the notch 126a is in communication with the intake air passage 124 and the suction air passage 125, and the two air passages 124 and 125 communicate with each other through the notch 126a. Intake air A is supplied to a suction head, serving as the first sucker, through the air passages 124 and 125, to draw a sheet by suction.

When the valve body 123 is continuously rotated, air intake is controlled by another rotary valve (not shown), and the sheet is drawn by suction with a suction head serving as the second sucker.

Simultaneously, the communication hole 126c of the valve body 123 is in communication with the suction air passage 125, and the hollow portion 126b and the suction air passage 125 communicate with each other. Exhaust air B from the exhaust pump is supplied to the first suction head, serving as the first sucker, through the suction air passage 125, and the sheet is quickly released from the suction head that has ended the suction operation. As a result, the sheet which is drawn by the suction head, serving as the second sucker, and is conveyed over the feeder board will not be torn or bent.

According to this embodiment, during the reverse operation, a sufficient amount of air can be supplied to the suction heads through the hollow portion 126b and the communication hole 126c within a short period of time. Since the hollow portion 126b, the communication hole 126c, and the suction air passage 125 are located on a substantially straight line and the distance between the hollow portion 126b and the suction air passage 125 becomes minimum, the air pressure loss in the air passage is decreased.

In the third embodiment, when the intake air operation time is short, an exhaust pump 137 may be connected through the hose 127 so that the air passage 124 serves as the exhaust air passage, and an intake pump 134 may be connected to the open end side of the hollow portion 126b through the hose 129 so that the hollow portion 126b serves as the intake air passage.

In the first and second embodiments, the sleeve 104 formed with the vent holes 111a and 111b is provided. However, the valve body 123 may be directly engaged in the through hole 122 of the main body 121, as in the third embodiment. With this structure, the vent holes 111a to 111d become unnecessary. In fine, it suffices if the valve body is rotatably held in a cylinder including a sleeve formed in the main body.

In the above embodiments, the rotary valve is applied to the sheet feeding unit. However, the present invention is not limited to this, but can similarly be applied to, e.g., the convertible cylinder unit or a sheet discharge unit of a printing press main body. Although the hollow portion is formed to have a circular section, it can have various other sections, e.g., an elliptic section, a square section, or a triangular section. Although only one rotary valve is used in the above embodiments, a series of a plurality of rotary valves may be used.

As has been described above, according to the present invention, the valve body of the rotary valve has a hollow portion and a notched portion respectively connected to different air sources, and the hollow portions and notched portions are combined with air passages that require predetermined characteristics. If the hollow portion is used as an air passage having a short air operation time and the notched portion is used as an air passage having a long air operation time, predetermined air pressures required for the respective air passages can be obtained.

Since the hollow portion and the notched portion are formed in the valve body, the entire rotary valve can be made compact. The reverse air passage from the suction unit can also be constituted by a hollow portion or a notch formed in the valve body, thus decreasing the manufacturing cost.

What is claimed is:

1. A rotary valve, which is interposed between first and second air sources for supplying air having a pressure that is one of higher than atmospheric pressure and lower than atmospheric pressure, and at least one air unit that performs a predetermined operation upon reception of the air supplied from said first and second air sources, to supply/stop supplying the air, comprising:

a valve body rotatably driven in a cylinder;

a main body for rotatably supporting said valve body;

a notch formed in a circumferential surface of said valve body to be connected to said first air source; and a first hollow portion formed in said valve body in an axial direction and having, in an end face of said valve body, an opening through which said first hollow portion is connected to said second air source, wherein said valve body rotates in an interlocked manner with operation of a printing press.

2. A rotary valve, which is interposed between first and second air sources for supplying air, and at least one air unit that performs a predetermined operation upon reception of the air supplied from said first and second air sources, to supply/stop supplying the air, comprising:

a valve body rotatably driven in a cylinder;

a main body for rotatably supporting said valve body;

a notch formed in a circumferential surface of said valve body to be connected to said first air source; and a first hollow portion formed in said valve body in an axial direction and having, in an end face of said valve body, an opening through which said first hollow portion is connected to said second air source, wherein said rotary valve is interposed at least between said first air source and a first air unit to which the air from said first air source is supplied, and between said second air source and a second air unit to which the air from said second air source is supplied, to selectively supply/stop supplying the air, and said rotary valve comprises a first air passage formed in said main body and having one end side connected to said first air source and the other end side that opens in an inner circumferential surface of said cylinder, a second air passage formed in said main body and having one end side connected to said first air unit and the other end side that opens in said inner circumferential surface of said cylinder, said second air passage being connected to said first air passage through said notch, a third air passage formed in said main body and having one end side connected to said second air unit and the other end side that opens in said inner circumferential surface of said cylinder, and a first communication hole formed in said valve body to connect said first hollow portion and said third air passage to each other.

3. A rotary valve according to claim 2, wherein one of said first and second air sources comprises an intake pump for supplying intake air, the other one of said first and second air sources comprises an exhaust pump for supplying exhaust air, one of said first and second air units comprises a suction unit which performs suction operation upon receiving the intake air from said intake pump, and the other one of said first and second air units comprises a discharge unit which performs discharge operation upon receiving the exhaust air from said exhaust pump.

4. A rotary valve according to claim 3, wherein said one end side of said first air passage is connected to said intake pump, said one end side of said second air passage is connected to said suction unit, said one end side of said third air passage is connected to said discharge unit, said first hollow portion is connected to said exhaust pump through an opening in an end face of said valve body, said suction unit is connected to said intake pump through said second air passage, said notch, and said first air passage, and said discharge unit is connected to said exhaust pump through said third air passage, said first communication hole, and said first hollow portion.

5. A rotary valve according to claim 4, wherein said rotary valve further comprises a second communication hole formed in said valve body to connect said first hollow portion and said second air passage to each other, and said suction unit is connected to said exhaust pump through said second air passage, said second communication hole, and said first hollow portion.

6. A rotary valve according to claim 5, wherein said first and second communication holes are displaced from each other in an axial direction of said cylinder, said first communication hole is arranged at the same position as an opening of said third air passage in the axial direction of said cylinder, and said second communication hole is arranged at the same position as an opening of said second air passage in the axial direction of said cylinder.

7. A rotary valve according to claim 2, wherein openings of said second and third air passages are arranged to be displaced from each other in an axial direction of said cylinder.

8. A rotary valve according to claim 2, wherein openings of said first and second air passages are arranged at the same position in an axial direction of said cylinder and to be phase-shifted from each other in a rotational direction of said valve body.

9. A rotary valve, which is interposed between first and second air sources for supplying air having a pressure that is one of higher than atmospheric pressure and lower than atmospheric pressure, and at least one air unit that performs a predetermined operation upon reception of the air supplied from said first and second air sources, to supply/stop supplying the air, comprising:

a valve body rotatably driven in a cylinder;

a main body for rotatable supporting said valve body;

a notch formed in a circumferential surface of said valve body to be connected to said first air source; and a first hollow portion formed in said valve body in an axial direction and having, in an end face of said valve body, an opening through which said first hollow portion is connected to said second air source, wherein said rotary valve comprises a first air passage formed in said main body and having one end side connected to said first air sources and the other end side that opens in an inner circumferential surface of said cylinder, a second air passage formed in said main body and having one end side connected to said air unit and the other end side that opens in said inner circumferential surface of said cylinder, said second air passage to be for coupling to said first air passage through said notch, and a first communication hole formed in said valve body to connect said first hollow portion and said second air passage to each other.

10. A rotary valve according to claim 9, wherein one of said first and second air sources comprises an intake pump for supplying intake air, and the other one of said first and second air sources comprises an exhaust pump for supplying exhaust air.

11. A rotary valve according to claim 10, wherein said one end side of said first air passage is connected to said exhaust pump, said first hollow portion is connected to said intake pump through an opening in an end face of said valve body, and said air unit comprises a suction unit connected to said exhaust pump through said second air passage, said notch and said first air passage, and to said intake pump through said second air passage, said first communication hole and said first hollow portion.

12. A rotary valve according to claim 9, wherein said rotary valve is interposed at least between said second air source and a first air unit to which the air from said second air source is supplied, and between said first air source and a second air unit to which the air from said first air source is supplied, to selectively supply/stop supplying the air, and said rotary valve comprises a third air passage formed in said main body and having one end side connected to said second air unit and the other end side that opens in an inner circumferential surface of said cylinder, a second hollow portion formed in said valve body in an axial direction and having, in the other end face of said valve body, an opening through which said second hollow portion is connected to said first air source, and a second communication hole formed in said valve body to connect said second hollow portion and said third air passage to each other.

13. A rotary valve according to claim 12, wherein
one of said first and second air sources comprises an intake pump for supplying intake air,
the other one of said first and second air sources comprises an exhaust pump for supplying exhaust air,
one of said first and second air units comprises a suction unit which performs suction operation upon receiving the intake air from said intake pump, and
the other one of said first and second air units comprises a discharge unit which performs discharge operation upon receiving the exhaust air from said exhaust pump.

14. A rotary valve according to claim 13, wherein
said first and second communication holes are arranged to be displaced from each other in an axial direction of said cylinder,
said first communication hole is arranged at the same position as an opening of said second air passage in the axial direction of said cylinder, and
said second communication hole is arranged at the same position as an opening of said third air passage in the axial direction of said cylinder.

15. A rotary valve according to claim 12, wherein openings of said first and third air passages are arranged to be displaced from each other in an axial direction of said cylinder.

16. A rotary valve according to claim 12, wherein openings of said first and second air passages are arranged at the same position in an axial direction of said cylinder and to be phase-shifted from each other in a rotational direction of said valve body.

17. A rotary valve, which is interposed between an intake air source for supplying intake air and a suction unit that performs suction operation upon reception of the intake air from said intake air source, and between an exhaust air source for supplying exhaust air and a discharge unit for discharging the exhaust air from said exhaust air source, to selectively supply/stop supplying the intake air and the exhaust air, comprising:

a valve body rotatably driven in a cylinder;
a main body for rotatably supporting said valve body;
an intake air passage formed in said main body and having one end side connected to said intake air source and the other end said that opens in an inner circumferential surface of said cylinder,
a suction air passage formed in said main body and having one end side connected to said suction unit and the other end side that opens in said inner circumferential surface of said cylinder,
a notch formed in a circumferential surface of said valve body, to allow said intake air passage and said suction air passage to communicate with each other,
a discharge air passage formed in said main body and having one end side connected to said discharge unit and the other end said that opens in said inner circumferential surface of said cylinder,
a hollow portion formed in said valve body in an axial direction and having, in an end face of said valve body an opening through which said hollow portion is connected to said exhaust air source, and
a communication hole formed in said valve body to allow said hollow portion and said discharge air passage to communicate with each other.

18. A rotary valve, which is interposed between an intake air source for supplying intake air and a suction unit that performs suction operation upon reception of the intake air from said intake air source, and between an exhaust air source for supplying exhaust air and a discharge unit for discharging the exhaust air from said exhaust air source, to selectively supply/stop supplying the intake air and the exhaust air, said rotary valve comprising:

a valve body rotatably driven in a cylinder;
a main body for rotatably supporting said value body;
an exhaust air passage formed in said main body and having one end side connected to said exhaust air source and the other end side that opens in an inner circumferential surface of said cylinder,
a suction air passage formed in said main body and having one end side connected to said suction unit and the other end side that opens in said inner circumferential surface of said cylinder,
a notch formed in a circumferential surface of said valve body, to allow said exhaust air passage and said suction air passage to communicate with each other,
a hollow portion formed in said valve body in an axial direction and having, in an end face of said valve body, an opening through which said hollow portion is connected to said intake air source, and
a communication hole formed in said valve body to allow said hollow portion and said suction air passage to communicate with each other.

\* \* \* \* \*

UNITED STATES PATENT AND TRADEMARK OFFICE
CERTIFICATE OF CORRECTION

PATENT NO.   : 6,254,082 B1
DATED        : July 3, 2001
INVENTOR(S)  : Sugimoto et al.

It is certified that error appears in the above-identified patent and that said Letters Patent is hereby corrected as shown below:

Title page,
Item [74], delete "Blakey" and insert -- Blakely --.

Column 10,
Line 2, delete "opposes" and insert -- is in communication with --.

Column 11,
Line 30, delete "a" and insert -- another --.

Column 14,
Line 12, delete "rotatable" and insert -- rotatably --.
Line 21, delete "sources" and insert -- source --.
Line 64, delete "first" and insert -- second --.

Column 16,
Line 27, delete "value" and insert -- valve --.

Signed and Sealed this

Twenty-fifth Day of June, 2002

Attest:

Attesting Officer

JAMES E. ROGAN
*Director of the United States Patent and Trademark Office*